(12) United States Patent
Meyer

(10) Patent No.: US 7,094,843 B2
(45) Date of Patent: Aug. 22, 2006

(54) EPOXY COMPOSITIONS HAVING IMPROVED SHELF LIFE AND ARTICLES CONTAINING THE SAME

(75) Inventor: Scott R. Meyer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 617 days.

(21) Appl. No.: 10/223,493

(22) Filed: Aug. 19, 2002

(65) Prior Publication Data

US 2004/0033324 A1 Feb. 19, 2004

(51) Int. Cl.
- C08L 61/08 (2006.01)
- C08L 63/00 (2006.01)
- C08G 8/28 (2006.01)
- C08F 283/10 (2006.01)
- C08K 5/13 (2006.01)

(52) U.S. Cl. ............... 525/481; 525/482; 524/325; 524/333; 524/765; 524/876; 428/40.1

(58) Field of Classification Search ............ 252/182.29
See application file for complete search history.

(56) References Cited

U.S. PATENT DOCUMENTS

| | | | |
|---|---|---|---|
| 3,032,527 A | 5/1962 | Greenlee | 260/43 |
| 3,329,737 A | 7/1967 | Smith | 260/831 |
| 3,519,576 A | 7/1970 | Johnson | 260/2 |
| 3,779,950 A | 12/1973 | Schenectady et al. | |
| 4,318,766 A | 3/1982 | Smith | |
| 4,713,137 A | 12/1987 | Sexton | |
| 4,923,912 A | 5/1990 | Sasaki et al. | 523/466 |
| 5,086,088 A | 2/1992 | Kitano et al. | 522/170 |
| 5,527,839 A * | 6/1996 | Walker | 523/404 |
| 5,688,905 A * | 11/1997 | Walker | 528/332 |
| 5,798,399 A | 8/1998 | Griggs et al. | 523/414 |
| 5,801,218 A | 9/1998 | McKenzie et al. | 523/414 |
| 5,859,153 A | 1/1999 | Kirk et al. | 525/481 |
| 5,883,193 A | 3/1999 | Karim | 525/113 |
| 6,120,858 A * | 9/2000 | Hirano et al. | 428/1.53 |
| 6,136,398 A | 10/2000 | Willett et al. | 428/41.3 |
| 6,248,204 B1 * | 6/2001 | Schuft | 156/305 |
| 6,287,669 B1 | 9/2001 | George et al. | 428/156 |
| 6,855,474 B1 * | 2/2005 | Kidnie et al. | 430/200 |

FOREIGN PATENT DOCUMENTS

| | | |
|---|---|---|
| JP | 05 255654 | 10/1993 |
| WO | WO 00/22024 | 4/2000 |

OTHER PUBLICATIONS

Ashcroft, W.R., Curing Agents for Epoxy Resins, *Chemistry and Technology of Epoxy Resins*, pp. 36-71 (1992).
King and Bell, Reactions in a Typical Epoxy-Aliphatic Diamine System, *Epoxy Resin Chemistry*, ACS Symposium Series 114, pp. 225-257 (1979).
Dow Plastics Product Information, D.E.N. 431, Epoxy Novolac, 2 pages, (2000).

* cited by examiner

*Primary Examiner*—Joseph D. Anthony
(74) *Attorney, Agent, or Firm*—Lisa P. Fulton

(57) ABSTRACT

Epoxy systems having improved shelf life are disclosed. The epoxy systems are suitable for use in a number of applications, including as an adhesive or as a sealant (e.g., as a component in a melt-sealing tape). Methods of making and using the epoxy systems are also disclosed.

22 Claims, No Drawings

EPOXY COMPOSITIONS HAVING IMPROVED SHELF LIFE AND ARTICLES CONTAINING THE SAME

FIELD OF THE INVENTION

The present invention relates to epoxy compositions having improved shelf life and methods of making such epoxy compositions. The present invention further relates to articles of manufacture containing an epoxy component having improved shelf life.

BACKGROUND

Epoxy systems may be categorized into two-part systems and one-part systems. In two-part systems, an epoxy resin "part" is maintained separate from a curative "part" to prevent premature curing of the epoxy resin. Some type of mechanical action (i.e., mixing, extrusion, etc.) must take place to combine the components of the two-part epoxy system so that a curing step can be initiated, often accompanied with either light and/or heat. Two-part epoxy systems have limited applicability in finished products, such as adhesive tapes, due to the need to physically separate the system components from one another.

In one-part epoxy systems, an epoxy resin is combined with a curative to form a single composition, which cures upon exposure to light and/or heat. One-part epoxy systems have an advantage over two-part systems in that the one-part epoxy system can be utilized in a number of products without the need to separate individual components of the system. One-part epoxy systems find utility in a number of applications including, but not limited to, adhesives, adhesive tapes, film adhesives, etc. The uncured product may be positioned as desired in a given application, and then subsequently cured by the application of energy, e.g., light and/or heat, without the need to combine additional components to the epoxy system.

Shelf life is an important parameter for epoxy-based compositions and products made therefrom, especially compositions and products formed from one-part epoxy systems. Over time, one-part epoxy compositions and products made therefrom can experience undesirable properties, such as premature reaction between components of the epoxy system. The premature reaction causes an increase in viscosity over time, which results in decreased flow of the composition. In some applications, such as sealing joints and seams in an automobile body, a sealant composition needs to be able to flow sufficiently to fill openings between seams and seal the joint to prevent water and moisture from leaking into the vehicle.

What is needed in the art is an epoxy composition having improved shelf life. What is also needed in the art is an adhesive or melt-sealing tape formed from an epoxy composition having improved shelf life, and in particular, a composition that does not increase significantly in viscosity over time.

SUMMARY

The present invention addresses some of the difficulties and problems discussed above by the discovery of a novel epoxy composition having improved shelf life. In particular, the present invention allows formulating flexibility to achieve desired properties (e.g., increased shelf life) in epoxy compositions such as, for example, adhesive compositions, sealants (e.g., melt-sealing compositions) and tapes comprising the epoxy composition. The shelf life of one-part epoxy compositions affects properties related to the ability to flow, and generally increases in viscosity over time. Such properties include wet-out on the surface to be sealed, the ability to seal the surface, bond strength, and weldability.

The epoxy compositions of the present invention contain at least one hydroxyl-containing aromatic compound added in a sufficiently low amount that the shelf life of the epoxy composition is extended beyond what it would be without the addition of the at least one hydroxyl-containing aromatic compound. The epoxy compositions of the present invention may be used in any application, which uses conventional epoxy compositions. The epoxy compositions of the present invention are particularly useful in applications where shelf life of the epoxy composition is of importance, particularly at temperatures below about 25° C., and preferable below about 100° F. (38° C.). The epoxy compositions of the present invention may be used in a number of embodiments including, but not limited to, adhesives for bonding together two or more substrates and sealant compositions to seal seams, welds, discontinuities, and the like. As an adhesive, the composition may be used to bond together any combinations of metal, (e.g., aluminum and steel), glass or ceramic materials, and polymeric materials. As a sealant, the composition can be used to seal roof ditches in vehicles, hem flanges, and the like. The compositions can be used alone or in combination with one or more additional components such as a polymeric film, a metal strip a molded part, a hot melt adhesive, a pressure-sensitive adhesive, a nonwoven or woven cloth, and the like. The compositions for either an adhesive or a sealant can be provided in various forms as desired, such as pastes, sticks, blocks, pillows, films, or tapes, depending upon how it will be used.

The present invention is also directed to a method of improving the shelf life of an epoxy composition. The method may comprise providing an epoxy composition suitable for use as at least one of an adhesive and a sealant; and incorporating at least one hydroxyl-containing aromatic compound in the epoxy composition in a sufficiently low amount to extend the shelf life of the epoxy composition beyond what the shelf life would be without the addition of the at least one hydroxyl-containing aromatic compound.

The present invention is further directed to articles of manufacture comprising an epoxy composition having improved shelf life and methods of making such articles. In one embodiment of the present invention, the article of manufacture comprises a layer of the epoxy composition in the form of a film or tape. In a second embodiment, the article is a multi-layer article, wherein at least one layer is the epoxy composition of the present invention, and at least one other layer is a substrate temporarily or permanently attached to the epoxy composition layer. In another embodiment, the article comprises a paste adhesive.

These and other features and advantages of the present invention will become apparent after a review of the following detailed description of the disclosed embodiments and the appended claims.

DETAILED DESCRIPTION

The present invention is directed to a novel epoxy composition having improved shelf life. The epoxy compositions comprise at least one epoxy component in combination with at least one hydroxyl-containing aromatic compound, which provides improved shelf life to the epoxy composition when compared to the composition without the hydroxyl-containing aromatic compound(s). The epoxy compositions of the present invention may be used in any conventional epoxy application, and find particular utility in applications where shelf life is an important consideration, such as applications wherein the epoxy-containing product is packaged and stored for days prior to use. The present invention is also directed to various articles of manufacture comprising epoxy compositions including, but not limited to, adhesive compositions, melt-sealing tapes, structural bonding tapes, etc. The present invention is further directed to a method of making epoxy compositions and articles of manufacture comprising the epoxy compositions.

A number of methods may be used to determine an improvement in the shelf life of an epoxy composition, one of which is the percent flow retention of an epoxy composition measured relative to an initial flow value. Percent flow retention may be measured using the following formula:

$$\% \text{ Flow Rentention} = \frac{45° \text{ Flow at Time, } t_x}{\text{Initial } 45° \text{ Flow}} \times 100$$

wherein:
"Initial 45° Flow" is an initial 45° flow value as measured by the test method described below; and
"45° Flow at Time, $t_x$" is a 45° flow value measured at a time, $t_x$, after the measurement of the initial 45° flow value.

Typically, time, $t_x$, is one to 60 days, but can be an extended period of time. Preferably, $t_x$ is 90 days. Percent flow retention may be measured on epoxy samples subjected to room temperature (about 25° C. (77° F.)) or at an elevated temperature, such as about 38° C. (100° F.).

Desirably, the epoxy compositions of the present invention (and products made therefrom) have a percent flow retention (% FR) value, as measured using the formula above, after being conditioned at room temperature (about 25° C. (77° F.)) for 14 days of at least about 40%, desirably at least about 50%, more desirably at least about 75%, and even more desirably, at least about 90%. The compositions may also have a % FR after being conditioned at room temperature for 30 days of at least about 20%, desirably at least about 40%, more desirably at least about 60 %, and even more desirably at least about 80%. Further, the compositions may have a % FR after being conditioned at room temperature for 60 days of at least about 20%, desirably at least about 40%, and more desirably at least about 75%.

Further, the epoxy compositions of the present invention (and products made therefrom) desirably have a % FR value, as measured using the formula above and after being conditioned at about 38° C. (100° F.)) for 7 days, of at least about 20%, more desirably at least about 30%, 40%, 50%, 60%, 70%, 80%, and even more desirably at least about 90%. In some cases, the epoxy compositions of the present invention (and products made therefrom) have a % FR value, as measured using the formula above and after being conditioned at about 38° C. (100° F.)) for 7 days, of more than 100%. The compositions may also have a % FR value after being conditioned at about 38° C. (100° F.)) for 14 days of at least about 10%, more desirably at least about 20%, 30%, 40%, 50%, 60%, and even more desirably of at least about 65%.

A variety of materials may be used to form the structural bonding tape of the present invention. A description of materials suitable for use in the present invention is given below.

I. Pure Epoxy System Materials

The following materials may be used to form a "pure" epoxy composition of the present invention. As used herein, the term "pure" refers to a composition, which does not contain thermoplastic polymeric material, and is distinguishable from "complex" epoxy compositions described below.

A. Epoxy Resins

The epoxy composition of the present invention may comprise one or more epoxy resins. Epoxy resins useful in the present invention may be any organic compound having at least one oxirane ring, that is polymerizable by a ring opening reaction. Such materials, broadly called epoxides, include both monomeric and polymeric epoxides and may be, for example, aliphatic, alicyclic, heterocyclic, cycloaliphatic, or aromatic and may further be combinations thereof. Epoxides may be liquid or solid or blends thereof, blends being especially useful in providing tacky adhesive films. These materials generally have, on average, at least two oxirane rings per molecule and may also be referred to as "polyepoxides." The polymeric epoxides include, but are not limited to, linear polymers having terminal epoxy groups (for example, a diglycidyl ether of a polyoxyalkylene glycol), polymers having skeletal oxirane units (for example, polybutadiene polyepoxide), and polymers having pendent epoxy groups (for example, a glycidyl methacrylate polymer or copolymer). The molecular weight of the epoxy resin may vary from about 74 to about 100,000 or more. Mixtures of various epoxy resins may also be used in the structural adhesive layer of the present invention. The "average" number of epoxy groups per molecule is defined as the number of epoxy groups in the epoxy resin divided by the total number of epoxy molecules present.

Suitable epoxy resins for use in the present invention include, but are not limited to, epoxy resins that contain cyclohexene oxide groups such as the epoxycyclohexane carboxylates, typified by 3,4-epoxycyclohexylmethyl-3,4-epoxycyclohexane carboxylate, 3,4-epoxy-2-methylcyclohexylmethyl-3,4-epoxy-2-methylcyclohexane carboxylate, and bis(3,4-epoxy-6-methylcyclohexylmethyl) adipate. For a more detailed list of useful epoxides of this nature, reference may be made to U.S. Pat. No. 3,117,099, the disclosure of which is incorporated herein by reference.

Other epoxy resins, which are particularly suitable for use in the present invention, include glycidyl ether monomers and have a structure as shown below:

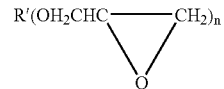

where R' is aliphatic, such as an alkyl group, aromatic, such as an aryl group, or combinations thereof; and n is an integer from about 1 to about 6. Examples of epoxy resins having a structure as shown in Formula 1 include, but are not limited to, the glycidyl ethers of polyhydric phenols obtained by reacting a polyhydric phenol with an excess of chlorohydrin such as epichlorohydrin, for example, the diglycidyl ether of 2,2-bis-(4-hydroxyphenol)propane (Bisphenol A). Further examples of epoxides of this type are described in U.S. Pat. No. 3,018,262, the disclosure of which is incorporated herein by reference. Desired epoxy resins include diglycidyl ethers of bisphenol A, hydrogenated bisphenol A-epichlorohydrin based epoxy resins, and aliphatic epoxy resins.

A number of commercially available epoxy resins may be used in the present invention. Epoxides, which are readily available, include, but are not limited to, octadecylene oxide; epichlorohydrin; styrene oxide; vinylcyclohexene oxide; glycidol; glycidyl methacrylate; diglycidyl ether of Bisphenol A (for example, those available under the trade designations "EPON™ 828", "EPON™ 1004", and "EPON™ 1001F" from Resolution Performance Products, Houston, Tex. (a new business formed from the resin unit of Shell Chemical Co., Houston, Tex.), and "DER-332" and "DER-334", from Dow Chemical Co., Midland, Mich.); diglycidyl ether of bisphenol F (for example, those available under the trade designations "ARALDITE™ GY281" from Ciba Specialty Chemicals Holding Company, Basel, Switzerland, and "EPON™ 862" from Resolution Performance Products); vinylcyclohexane dioxide (for example, one available under the trade designation "ERL-4206" from Union Carbide Corp., Danbury, Conn.); 3,4-epoxycyclohexylmethyl-3,4-epoxycyclohexene carboxylate (for example, one available under the trade designation "ERL-4221" from Union Carbide Corp.); 2-(3,4-epoxycyclohexyl-5,5-spiro-3,4-epoxy) cyclohexane-metadioxane (for example, one available under the trade designation "ERL-4234" from Union Carbide Corp.); bis(3,4-epoxycyclohexyl) adipate (for example, one available under the trade designation "ERL-4299" from Union Carbide Corp.); dipentene dioxide (for example, one available under the trade designation "ERL-4269" from Union Carbide Corp.); epoxidized polybutadiene (for example, one available under the trade designation "OXIRON™ 2001" from FMC Corp., Chicago, Ill.); epoxy silanes, for example, beta-3,4-epoxycyclohexylethyltrimethoxy silane and gamma-glycidoxypropyltrimethoxy silane, commercially available from Union Carbide; flame retardant epoxy resins (for example, one available under the trade designation "DER-542", a brominated bisphenol type epoxy resin available from Dow Chemical Co.); 1,4-butanediol diglycidyl ether (for example, one available under the trade designation "ARALDITE™ RD-2" from Ciba Specialty Chemicals); hydrogenated bisphenol A-epichlorohydrin based epoxy resins (for example, one available under the trade designation "EPONEX™ 1510" from Resolution Performance Products); and polyglycidyl ether of phenol-formaldehyde novolak (for example, one available under the trade designation "DEN-431" and "DEN-438" from Dow Chemical Co.).

The epoxy composition of the present invention may comprise one or more epoxy resins in an amount, which varies depending on the desired properties and use of the resulting composition. Desirably, epoxy composition of the present invention comprises one or more epoxy resins in an amount of up to about 96 weight percent, based on the total weight of the composition. More desirably, the epoxy composition of the present invention comprises one or more epoxy resins in an amount of from about 15 weight percent to about 85 weight percent, based on the total weight of the composition. Even more desirably, the epoxy composition of the present invention comprises one or more epoxy resins in an amount of from about 20 weight percent to about 60 weight percent, based on the total weight of the composition.

B. Hydroxyl-Functional or Hydroxyl-Containing Aromatic Compounds

The epoxy compositions of the present invention contain at least one hydroxyl-functional or hydroxyl-containing aromatic compound, which contributes to improved shelf life of the epoxy composition relative to the shelf life of the epoxy composition without the hydroxyl-functional or hydroxyl-containing aromatic compound(s). As used herein, the terms "hydroxyl-functional" and "hydroxyl-containing" are used to represent compounds having at least one and desirably at least two hydroxyl groups. The terms "hydroxyl-functional" and "hydroxyl-containing" are used interchangeably. Further, the terms "hydroxyl-functional aromatic compounds" and "hydroxyl-containing aromatic compounds" do not include other crosslinked or polymeric materials described below, which may also contain one or more hydroxyl groups, (e.g. OH groups attached to the backbone of an epoxy).

Further, the hydroxyl-containing aromatic compounds are also desirably substantially free of groups, which may be thermally and/or photolytically unstable so that the compounds will not decompose or liberate volatile components when exposed to actinic radiation and/or heat during storage. Desirably, the hydroxyl-containing aromatic compounds contain two or more hydroxyl groups bonded directly to an aromatic carbon atom.

Desirably, the hydroxyl-containing aromatic compounds are hydroxyl-functional novolac (HFN) resins. HFN resins are the reaction product of formaldehyde in excess phenol (or substituted phenol) under acidic conditions. HFNs have a molecular structure as shown below

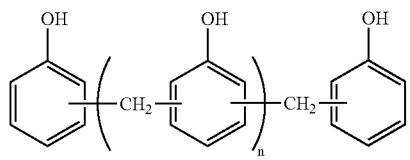

wherein n is in the range of from 0 to 9, desirably n is in the range of from 1 to 8, and even more desirably, n is in the range of from 2 to 6. Desirably, the HFN resin has a number average molecular weight of less than about 1000, more desirably from about 300 to about 800, and even more desirably from about 450 to about 750. Further, the functionality of the HFN resin is desirably less than about 9, more desirably in the range of from about 3 to about 8, and even more desirably in the range of from about 4 to about 7.

Commercially available HFN resins suitable for use in the present invention include, but are not limited to, HFNs available under the trade designations DURITE SD-7280, SD-1702, and SD-1731 from Borden Chemical, Inc. (Louisville, Ky.).

Improved shelf life of epoxy compositions results from the use of one or more of the above-described hydroxyl-containing aromatic compounds when present in an amount of less than about 8 parts by weight (pbw) based on 100 parts by weight of the epoxy resin present. Desirably, one or more of the above-described hydroxyl-containing aromatic compounds are present in an amount of less than about 5 pbw based on 100 parts by weight of the epoxy resin present. More desirably, one or more of the above-described hydroxyl-containing aromatic compounds are present in an amount of from about 0.1 pbw to about 4.0 pbw, even more desirably 0.2 pbw to about 2.4 pbw, even more desirably 0.3 pbw to about 2.0 pbw, based on 100 parts by weight of the epoxy resin present.

When the amount of hydroxyl-containing aromatic compound(s) exceeds about 8 pbw of the epoxy resin present, shelf life of the epoxy composition does not improve, and may deteriorate. It is believed that when the level of hydroxyl-containing aromatic compound(s) exceeds an amount of about 8 pbw of the epoxy resin present, the hydroxyl-containing aromatic compound(s) begins to act as an accelerator, and prematurely initiates curing of the epoxy composition. Use of hydroxyl-containing materials has been described in the art to accelerate the cure of epoxy resin compositions (*Chemistry and Technology of Epoxy Resins*, edited by Bryan Ellis, 1993; Section 2.2.1.1-W. R. Ashcroft; "Curing Agents for Epoxy Resins").

C. Curatives

The epoxy composition of the present invention comprises one or more curatives in an amount, which can vary depending on the particular curative used, and the desired properties and use of the resulting composition. Curatives suitable for use in the present invention include any heat-activatable curing agent for epoxy resins (for example, compounds that effect curing and crosslinking of the epoxide by entering into a chemical reaction therewith). Desirably, such curing agents are thermally stable at temperatures at which mixing of the composition components takes place.

Desirably, the epoxy composition of the present invention contains one or more thermal curatives, which are solid at room temperature (about 25° C.), and have a melting point above about 100° C., more desirably above about 145° C., and even more desirably above about 200° C. Suitable curatives include, but are not limited to, amines such as substituted imidazoles, and substituted guanidines; substituted ureas; and mixtures thereof. Suitable substiuents for imidazoles, guanidines and ureas include, but are not limited to, alkyl groups having up to 20 carbon atoms, benzyl groups, phenyl groups, cyano groups, amine groups, melamine groups etc. Examples of substituted imidazoles include, but are not limited to, 2-methyl-imidazole, 2-phenyl-imidazole. An example of a substituted urea is isophorone bisdimethyl urea. An example of a substituted guanidine is dicyandiamide. More desirably, the epoxy composition of the present invention contains one or more imidazoles, guanidines, or ureas having a melting point of greater than about 100° C., more desirably above about 145° C., and even more desirably above about 200° C.

Suitable curatives are commercially available under the CUREZOL™ trade designation from Air Products and Chemicals, Allentown, Pa., such as CUREZOL™ 2PHZ-S, CUREZOL™ 2MZ-Azine, and CUREZOL™ 2MA-OK; under the AMICURE™ trade designation from Air Products and Chemicals, Allentown, Pa., such as AMICURE™ CG-1200; and under the OMICURE™ trade designation from CVC Specialty Chemicals, Inc., Maple Shade, N.J., such as OMICURE™ U-35 and OMICURE™ U-52. An especially desirable curative is CUREZOL™ 2MZ-Azine.

The thermal curative desirably comprises from about 0.5 to about 25 weight percent, more desirably from about 1.0 to about 20 weight percent, even more desirably from about 1.5 to about 15 weight percent of a thermal curative, based on the total weight of the composition.

II. Complex Epoxy System Materials

In addition to the components of a "pure" epoxy composition described above, a "complex" epoxy system of the present invention may contain one or more of the following components.

A. Thermoplastic Polymers

Complex epoxy systems of the present invention may contain one or more thermoplastic polymers. The one or more thermoplastic polymers may be present in the epoxy composition in an amount, which varies depending on the desired properties and end use of the resulting composition. Desirably, the one or more thermoplastic polymers, when present, are present in an amount of up to about 90 weight percent, based on the total weight of the composition. More desirably, the one or more thermoplastic polymers, when present, are present in an amount of from about 5 weight percent to about 80 weight percent, even more desirably, from about 15 weight percent to about 75 weight percent, based on the total weight of the composition. The thermoplastic polymer may be added for various reasons including, but not limited to, toughening of an epoxy adhesive, providing flow properties in a sealant, and providing pressure-sensitive adhesive properties.

Suitable thermoplastic polymers include, but are not limited to, rubbers and rubbery block copolymers, polyesters, ethylene vinyl acetate copolymers, polyacrylate polymers and copolymers, polyurethanes, ethylene carbon monoxide vinyl acetate copolymers, and polyamides. Blends or mixtures of two or more thermoplastic polymers, either within the same chemical class or from different chemical classes, may by be used.

Thermoplastic polymers that are preferred for sealant compositions and tapes include polyesters, ethylene vinyl acetate (EVA) copolymers, ethylene carbon monoxide vinyl acetate copolymers, polyacrylate polymers and copolymers, polyurethanes, polyamides, and combinations thereof.

i. Thermoplastic Polyesters

Thermoplastic polyesters suitable for use in the present invention include both hydroxyl- and carboxyl-terminated materials, which may be amorphous or semicrystalline, of which the hydroxyl-terminated materials are more desired.

Suitable thermoplastic polyesters are described in U.S. Pat. No. 6,287,669, the entire content of which is incorporated herein by reference. Useful, commercially available hydroxyl-terminated polyester materials include various saturated, linear, semicrystalline copolyesters are available under the trade designations DYNAPOL™ S1402, S1358, S1227, S1229, and S1401 from Huels AG (Creanova, Inc., Marl, Germany). Useful saturated, linear amorphous copolyesters include materials available under the trade designations "DYNAPOL™ S1313 and S1430 from Huels AG (Creanova, Inc., Marl, Germany).

ii. Ethylene Vinyl Acetate Copolymer

The epoxy composition of the present invention may also contain one or more thermoplastic EVA copolymers. Suitable thermoplastic EVA copolymer resins include, but are not limited to, EVA copolymers containing from about 9 to about 89 percent, desirably from about 28 to about 80 percent, and more desirably from about 40 to about 80 percent, even more desirably from about 40 to about 70 percent vinyl acetate by weight of the copolymer. Suitable EVA copolymers are disclosed in U.S. Pat. No. 6,136,398, the entire content of which is incorporated herein by reference.

Examples of commercially available EVA copolymers, which may be used in the present invention include, but are not limited to, those sold by E. I. Du Pont de Nemours and Co. (Wilmington, Del.) under various product numbers under the trade designation ELVAX™, (e.g., 40W, 150, 210, 250, 260, 265, 450, 550, 560, 660, 670, 750) and ELVALOY™ (e.g., 741); those sold by Millenium Petrochemicals, Inc. (Cincinnati, Ohio) with various product numbers under the trade designation ULTRATHENE™ (e.g., UE 649-22 and UE 685-009); those sold by Bayer Corp. (Pittsburgh, Pa.) under various product numbers under the trade designation LEVAPREN™ (e.g., 400, 450, 452, 456, 500HV, 600HV, 700HV, and KA 8479); and EVA copolymers (e.g., 4030M) available from AT Plastics, Inc. (Brampton, Ontario, Canada).

iii. (Meth)Acrylates

The epoxy compositions of the present invention may also contain one or more thermoplastic (meth)acrylate resins. The (meth)acrylate resins may be made by a variety of polymerization methods, including bulk, solution, suspension, emulsion and photopolymerization. The (meth)acrylate resins are desirably compatible with each other and with other composition constituents. An example of suitable (meth)acrylate polymers are described in U.S. Pat. No. 5,086,088, incorporated in its entirety by reference.

Other polymeric materials may be added to the epoxy composition as toughening agents. Such toughening agents are known and are described in the art including WO 200022024A, incorporated in its entirety herein by reference.

C. Other Additives

The epoxy systems of the present invention may contain up to about 50 weight percent, desirably, up to about 30 percent, of various additives such as fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, and the like, such as silica, glass, clay, talc, pigments, colorants, glass beads or bubbles, and antioxidants, so as to reduce the weight and/or cost of the epoxy composition, adjust viscosity, and/or provide additional reinforcement or modify the thermal conductivity of the epoxy compositions and articles of the present invention so that a more rapid or uniform cure may be achieved.

III. Method of Making Epoxy Compositions

The epoxy compositions of the present invention may be prepared by using either a batch or a continuous process as long as the components are compatible in the melt phase.

In a batch process, the epoxy compositions of the invention are prepared by mixing the various ingredients in a suitable vessel at an elevated temperature sufficient to liquefy the components so that they can be efficiently mixed with stirring until the components are thoroughly melt blended but without thermally degrading or causing premature curing of the materials. The components may be added simultaneously or sequentially, although it is desired to first blend (in order) the thermoplastic polyester, if present, the epoxy-containing material, and the hydroxyl-containing aromatic compound(s), followed by the addition of a curative for the epoxy-containing material. Typically, the epoxy resin can be heated to between about 90° C. and about 177° C. to melt it. A pre-mix can be prepared by mixing the epoxy and hydroxyl containing material at a higher temperature, e.g., 177° C. and then cooled to a lower temperature, e.g., about 120° C. before adding the curatives. Desirably, the curatives are added to the epoxy composition at a temperature lower than the melting point or activation temperature of any of the curatives.

In a continuous process, the epoxy compositions of the present invention are mixed in an extruder as above, for example a twin-screw extruder, having a static mixer, and an appropriate output orifice (i.e., film die, sheet die, profile die, etc.) and a take-up roll and wind up roll(s), as appropriate. Take-up line speed is adjusted as appropriate for the output form.

The epoxy compositions of the invention can be used for adhesives, sealants, or coatings as desired. It may be adhered to various substrates, including, but not limited to, polymeric materials, metals, glass, ceramics, cellulosic materials, and the like. Substrates may be in any configuration including, but not limited to, films, foils, foams, fabrics, primed metal surfaces, porcelain coated metal surfaces, and the like. Typically, epoxy compositions are applied to a single substrate by any of the methods described above, and once so applied are heated to initiate curing of the epoxy-containing material. Alternatively, the epoxy compositions of the present invention are applied to any of the above-described substrates in an uncured state, and remain in an uncured state for a period of time prior to actual use.

Curing of the epoxy compositions begins upon exposure of the epoxy composition to thermal energy, that is, heat. The amount of heat required to completely cure the epoxy composition depends upon such factors as the thermal curative used, the amount of curative, and the thickness of the composition, among others. Exposure times may be from 0.01 to 30 minutes or even longer, desirably from about 1 to about 10 minutes at temperatures ranging from about 50° C. to about 350° C., although differing temperatures may be used depending on the specific curative used. An oven is desirably used to cure epoxy compositions of the present invention, although induction heating and radiant heating are also suitable.

IV. Articles of Manufacture

Articles containing epoxy compositions described above may be readily prepared in many ways. For example, the ingredients for the epoxy composition may be melt blended as described above and then formed into a desired shape by a variety of different methods. For example, the epoxy composition can be coated onto a release liner using a heated knife coater. Alternatively, the epoxy composition ingredients may be compounded in an extruder and then extruded through a die having a desired profile to produce a shaped strip of epoxy composition; that is, a strip having a desired cross-sectional shape. The compositions may also be supplied in sticks, billets, pillows, and the like for feeding into a hot melt coater. The composition may also be supplied in bulk and pumped to a coater or applicator, using heat to modify the flow characteristics as needed. The compositions may also be prepared as a paste that can be applied to a surface.

The epoxy composition may be combined (as a liquid coating or extruded shape, such as a film) with one or more layers of additional material to form a variety of articles of manufacture. Suitable additional layers include, but are not limited to, the layers discussed below.

A. Adhesive Layers

In addition to the epoxy composition described above, which may function as an adhesive, epoxy-containing articles of the present invention may include one or more adhesive layers on either side of the epoxy composition. It should be noted that the one or more adhesive layers may contain filler materials as described above.

The one or more adhesive layers may be any suitable adhesive known in the art. Desirably, the adhesive layer, when present, is an adhesive, which is activatable by pressure, heat or a combination thereof. Suitable adhesive layer compositions include, but are not limited to, adhesive compositions based on (meth)acrylates, rubber/resins, epoxies, urethanes or combinations thereof. The adhesive layer may be applied to an outer surface of the epoxy composition layer by coating a solution, water-based, all solids, or hot-melt adhesive on the surface and drying, curing, or cooling to form an adhesive layer, e.g., a pressure-sensitive adhesive layer. The adhesive layer may also be applied to the epoxy layer as a transfer adhesive, i.e., a pressure-sensitive adhesive layer provided on a release liner. The adhesive layer adhesive composition may contain additives including, but not limited to, tackifiers, plasticizers, fillers, antioxidants, stabilizers, pigments, diffusing materials, curatives, fibers, fiber reinforcements (in the form of woven, nonwoven, knitted, or unidirectional fabrics), filaments, and solvents.

A general description of useful pressure sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

In one embodiment of the present invention, the epoxy-containing article of the present invention comprises one epoxy composition layer in combination with at least one adhesive layer, wherein the at least one adhesive layer is present on an outer surface of the epoxy composition layer in the form of a continuous or discontinuous coating. When the adhesive layer is present as a discontinuous coating, the adhesive layer may be present as dots, squares, triangles, lines, or any other configuration along the outer surface of the epoxy composition layer.

B. Release Liners

As described above, the epoxy composition of the present invention may be combined with one or more release liners to protect an outer surface of the epoxy composition. Release liners are well known in the art, and any known release liner may be used in the present invention. Typically, the release liner comprises a film or paper substrate that is optionally coated with a release material such as silicone or fluorocarbon materials. Suitable film substrates include but are not limited to polyethylene, polyester that may be oriented, e.g., polyethylene terephthalate, and polypropylene which may be oriented.

Commercially available release liners suitable for use in the present invention include, but are not limited to, silicon coated paper, and silicon coated films, such as polyester films. Examples of suitable release liners include, but are not limited to, release liners sold by Akrosil Europe (Huerlen, Netherlands) and International Paper (Menasha, Wis.) under the trade designation AKROSIL™, e.g., product designations Paper Liner ZG-3223 and Paper Liner SBL 60 SC SILOX F1U/F4B, and release liners available from Daubert Coated Products, Inc. (Dixon, Ill.).

C. Other Possible Layers

Suitable additional layers include, but are not limited to, polymer films, metal foils, papers, foam sheets, and fabrics, such as the fiber-containing webs. The one or more additional layers may be attached to the epoxy composition layer by a pressure-sensitive adhesive as described above or by the epoxy composition itself. Suitable additional layers include the following.

i. Fiber Reinforcements

A woven fabric or nonwoven web or scrim may be included in an epoxy composition of the present invention, either embedded in to composition or laminated to an outer surface of an epoxy-containing layer. The fabric or web can be laminated to the epoxy-containing layer using an adhesive or by heat lamination techniques, and may be inserted between two epoxy-containing layers. Addition of a nonwoven web has been found to be useful in controlling the flow of the epoxy-containing layer. The woven fabric or nonwoven web can also be used to impart strength to the epoxy-containing layer for better handling properties.

ii. Permanently Attached Film Substrates

The epoxy-containing articles of the present invention may also contain thermoplastic films. Desirably, the films are dimensionally stable at the temperatures to which they might be exposed to either in applying an epoxy-containing, melt-flowable sheet material to a substrate, e.g., when the sheet material is heated to a temperature necessary to cause flow and/or thermosetting of the epoxy-containing sheet material, or after it has been applied, e.g., exposure to cold weather temperatures, sunlight, etc. Useful films include, but are not limited to, polyurethane films, oriented polyester films, polyimide films, polyolefin films, and the like. The films can be used to provide smooth surfaces for painting or as a finished surface after an epoxy-containing coating or layer has been bonded to a surface.

Thermoset films can also be used. Examples of thermoset films include, but are not limited to, films made from the above-described epoxy composition that have been crosslinked, other conventional epoxy films, and the like.

Both thermoset and thermoplastic films should be dimensionally stable at the temperatures to which they are exposed. By dimensionally stable, it is meant that the films have sufficient integrity at the temperatures of use, and particularly, during the heat curing cycle of the epoxy-containing layer at about 120° C. to 200° C. for 20 to 40 minutes, so they do not melt and flow. Also the films do not exhibit wrinkling when they are heated to a temperature at which the epoxy-containing layer flows, and subsequently cooled. The films also have enough integrity to prevent entrapped air bubbles in the epoxy-containing layer from blowing through the film and causing a defect. Desirably, the films, after they have been laminated to an epoxy-containing layer and heated to a temperature needed to bond the epoxy-containing layer to a surface, may exhibit a downweb and crossweb shrinkage of less than about 5%, more desirably, less than about 3%, and even more desirably, less than about 2%. In highly desired embodiments, the films will exhibit less than 1% shrinkage after heating.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Test Methods

The following test methods were used to measure physical properties of exemplary uncured and cured epoxy compositions and articles containing the same.

Test Methods for the Epoxy Compositions

45° Flow Test

A metal panel that had been electrocoated (E-coated) with ED 5100 Electrodepostion Paint (panels obtained from ACT Laboratories, Inc., Hillsdale, Mich.) was cleaned by spraying the painted surface with 50 percent aqueous isopropanol and wiping dry, allowing sufficient time to ensure complete drying. The sample to be measured (typically 14.5 mm by 25.4 mm) was lightly adhered to the E-coated panel so that the narrow edge of the sample was pointing down the panel. The panel was then placed in an oven at a 45° incline for 20 minutes at 177° C. unless otherwise specified. The sample was then removed from the oven and allowed to cool to room temperature. Flow was measured as the distance (in mm) the sample flowed relative to its initial position.

EXAMPLES

The following examples were conducted using the materials shown in the Glossary of Materials below.

Glossary of Materials

Epoxy 1—EPON™ 828—liquid diglycidyl ether of bisphenol A having an epoxy equivalent weight (EEW) of 185–192 available from Resolution, Houston Tex.;

Epoxy 2—Modified bisphenol A epoxy resin prepared according to Part A of Example 1 of U.S. Pat. No. 5,407,978, having an EEW of 1000–1150;

Epoxy 3—Modified bisphenol A epoxy resin prepared according to Part A of Example 1 of U.S. Pat. No. 5,407,978, having an EEW of 750–950;

HFC 1—DURITE™ SD-7280—hydroxy-containing aromatic compound having an OH equivalent of 105, functionality of about 7, and formula weight of 735, available from Borden Chemical, Inc, Louisville Ky.;

HFC 2—DURITE™ SD-1702—hydroxy-containing aromatic compound having an OH equivalent of 105, functionality of about 5.8, and formula weight of 609, available from Borden Chemical, Inc, Louisville Ky.;

HFC 3—DURITE™ SD-1731—hydroxy-containing aromatic compound having an OH equivalent of 105, functionality of about 4.8, and formula weight of 604, available from Borden Chemical, Inc, Louisville Ky.;

CUREZOL™ 2MZ-Azine—substituted imidazole, solid powder with a melting point from 247–251° C. available from Air Products and Chemicals, Allentown, Pa.;

CUREZOL™ 2PHZ-S—substituted imidazole, solid powder with a melting point from 213–255° C. available from Air Products and Chemicals, Allentown, Pa.;

AMICURE™ CG-1200—dicyandiamide—solid powder with a melting point of 206° C. available from Air Products and Chemicals, Allentown, Pa.;

OMICURE™ U-35—isophorone bisdimethyl urea—solid powder with melting point from 202–212° C. available from CVC Specialty Chemicals, Inc., Maple Shade, N.J.;

OMICURE™ U-52—4,4' methylene bis (phenyl dimethyl urea)—solid powder with melting point from 220–230° C. available from CVC Specialty Chemicals, Inc., Maple Shade, N.J.;

DYNAPOL™ S1402—hydroxy-functional, amorphous branched copolyester with a $T_g$=−12° C., available from Huels AG (Creanova Specialties), Marl Germany.

ELVAX™ 40W ethylene vinyl acetate copolymer with 40% vinyl acetate with a melt index of 56 decigrams/minute available from DuPont Company Polymer Products, Wilmington, Del.; and ELVALOY™ 741 ethylene carbon monoxide vinyl acetate copolymer with a melt index of 35 grams/10 min., available from DuPont Company Polymer Products, Wilmington, Del.

Examples 1–3 and Comparative Examples C1–C2

Epoxy compositions were prepared using the components shown in Table 1 below. All of the components except the curatives (2MZ-Azine and DICY) were added to a small aluminum container in the amounts indicated in Table 1. The container was placed in an electric forced air convection oven for 177° C. for 1 to 2 hours until the components had melted. Immediately after removing the container from the oven, the mixture was stirred by hand using a tongue depressor to form a uniform mixture. The mixture was cooled to room temperature, and then re-heated in an electric forced air oven at 121° C. for 1 to 2 hours. After removing the container from the oven, the curatives were stirred in by hand with a tongue depressor. The composition was then coated between two silicone release coated polyester films on a 15.2 cm wide hand spread coater to form a sheet. The thickness of the coating was dependent on the coater settings and had some variations depending upon variations in settings and in the polyester films. The silicone coated polyester films were removed and the sheets were tested for flow retention (% FR). Test results are shown in Table 2 below.

TABLE 1

| | Composition - pbw | | | | |
|---|---|---|---|---|---|
| Component | Ex 1 | Ex 2 | Ex 3 | Ex C1 | Ex C2 |
| DYNAPOL™ S1402 | 59 | 60 | 60 | 59 | 60 |
| Epoxy 1 | 15 | 15 | 15 | 15 | 15 |
| Epoxy 2 | 15 | 0 | 0 | 15 | 0 |
| Epoxy 3 | 0 | 15 | 15 | 0 | 15 |
| HFC 1 | 0.39 | 0.5 | 1.0 | 0 | 0 |
| DICY | 0 | 7 | 7 | 0 | 7 |
| CUREZOL™ 2MZ-Azine | 7 | 3 | 3 | 7 | 3 |

TABLE 2

| | Test Results | | | | |
|---|---|---|---|---|---|
| Test Parameter | Ex 1 | Ex 2 | Ex 3 | Ex C1 | Ex C2 |
| Initial Flow - mm | 47 | 42 | 31 | 73 | 97 |
| % FR after 7 days @ 38° C. | 115 | 117 | 87 | 3 | 72 |
| % FR after 14 days @ 38° C. | 104 | 112 | 74 | 0 | 4 |
| % FR after 90 days @ 25° C. | — | 95 | 45 | — | 4 |
| Thickness - mm | 1.6 | 1.6 | 1.5 | 1.6 | 1.5 |

Examples 4–15 and Comparative C3

Epoxy compositions were prepared as in Example 1 except using 50 parts by weight (pbw) of Epoxy 1, 50 pbw of Epoxy 2, 23.35 pbw of CUREZOL™ 2MZ-Azine curative, and varying amounts and types of hydroxy-functional compounds (HFC) indicated in Table 3 below. Sheets of the epoxy compositions were prepared at an approximate thickness of 1.1 mm. The compositions were aged and tested for flow retention. Results are shown in Table 3.

TABLE 3

| | Amt. HFC (pbw) | | | Thickness | Initial Flow | % FR After 7 Days | % FR After 14 Days |
|---|---|---|---|---|---|---|---|
| Ex. | HFC1 | HFC2 | HFC3 | (mm) | (mm) | @ 38° C. | @ 38° C. |
| 4 | 1.00 | 0 | 0 | 1.1 | 48 | 146 | 165 |
| 5 | 2.00 | 0 | 0 | 1.2 | 48 | 140 | 146 |
| 6 | 4.00 | 0 | 0 | 1.1 | 45 | 78 | 44 |
| 7 | 8.00 | 0 | 0 | 1.3 | 40 | 0 | 0 |
| 8 | 0 | 0.83 | 0 | 1.2 | 52 | 110 | 117 |
| 9 | 0 | 1.66 | 0 | 1.2 | 61 | 82 | 80 |
| 10 | 0 | 3.31 | 0 | 1.2 | 54 | 44 | 28 |
| 11 | 0 | 6.63 | 0 | 1.2 | 47 | 0 | 0 |
| 12 | 0 | 0 | 0.69 | 1.1 | 68 | 54 | 66 |
| 13 | 0 | 0 | 1.37 | 1.1 | 62 | 58 | 60 |
| 14 | 0 | 0 | 2.74 | 1.1 | 56 | 23 | 4 |

TABLE 3-continued

| | Amt. HFC (pbw) | | | Thickness (mm) | Initial Flow (mm) | % FR After 7 Days @ 38° C. | % FR After 14 Days @ 38° C. |
|---|---|---|---|---|---|---|---|
| Ex. | HFC1 | HFC2 | HFC3 | | | | |
| 15 | 0 | 0 | 5.49 | 1.2 | 53 | 0 | 0 |
| C3 | 0 | 0 | 0 | 1.1 | 103 | 0 | 0 |

Examples 16–18 and C4

Compositions for Examples 16 and 17 were prepared as in Example 4 that the HFC was bisphenol A (available from Shell Chemical Co., Deer Park, Tex.). Example 18 used HFC 1 and example C4 had no HFC. The amounts of HFC (Amt—pbw) are shown in Table 4 below, as well as, test results for flow retention under various aging conditions.

TABLE 4

| | | | % FR after aging | | | | |
|---|---|---|---|---|---|---|---|
| Ex. | Amt (pbw) | Thickness (mm) | Initial flow (mm) | 14 days @ RT | 30 days @ RT | 4 days @ 38° C. | 7 days @ 38° C. | 14 days @ 38° C. |
| 16 | 0.23 | 0.94 | 88 | 76 | 53 | 64 | 38 | 0 |
| 17 | 0.62 | 0.98 | 91 | 64 | 20 | 48 | 1 | 0 |
| 18 | 1.30 | 0.94 | 48 | 94 | 117 | 65 | 81 | 71 |
| C4 | 0 | 0.90 | 91 | 77 | 55 | 58 | 29 | 0 |

Examples 19–34 and C5–C8

Epoxy compositions were prepared as in Example 4 except varying amounts of HFC 1, and 22 pbw of different curatives (based on 100 pbw of epoxy) shown in Table 3 were used. Comparative examples C5–C8 had no HFC.

TABLE 5

| Ex. | HFC1 (pbw) | Curative | Thickness (mm) | Initial Flow (mm) | % FR After 7 Days @ 38° C. | % FR After 14 Days @ 38° C. |
|---|---|---|---|---|---|---|
| C5 | 0 | 2MZ Azine | 0.9 | 95 | 0 | 0 |
| 19 | 1.0 | 2MZ Azine | 0.9 | 42 | 152 | 167 |
| 20 | 2.0 | 2MZ Azine | 1.0 | 41 | 141 | 141 |
| 21 | 4.0 | 2MZ Azine | 1.0 | 37 | 43 | 30 |
| 22 | 8.0 | 2MZ Azine | 0.9 | 33 | 0 | 0 |
| C6 | 0 | CUREZOL ™ 2PHZ-S | 0.9 | 114 | 69 | 0 |
| 23 | 1.0 | CUREZOL ™ 2PHZ-S | 0.92 | 55 | 155 | 24 |
| 24 | 2.0 | CUREZOL ™ 2PHZ-S | 0.9 | 58 | 121 | 19 |
| 25 | 4.0 | CUREZOL ™ 2PHZ-S | 0.9 | 63 | 35 | 0 |
| 26 | 8.0 | CUREZOL ™ 2PHZ-S | 0.9 | 64 | 0 | 0 |
| C7 | 0 | OMICURE ™ U-52 | 0.9 | 68 | 129 | 96 |
| 27 | 1.0 | OMICURE ™ U-52 | 0.9 | 44 | 116 | 102 |
| 28 | 2.0 | OMICURE ™ U-52 | 0.9 | 35 | 151 | 103 |
| 29 | 4.0 | OMICURE ™ U-52 | 0.9 | 45 | 84 | 58 |
| 30 | 8.0 | OMICURE ™ U-52 | 1.0 | 50 | 40 | 0 |
| C8 | 0 | OMICURE ™ U-35 | 0.9 | 262 | 84 | 87 |
| 31 | 1.0 | OMICURE ™ U-35 | 1.0 | 234 | 79 | 92 |
| 32 | 2.0 | OMICURE ™ U-35 | 1.0 | 160 | 131 | 121 |
| 33 | 4.0 | OMICURE ™ U-35 | 1.0 | 184 | 86 | 85 |
| 34 | 8.0 | OMICURE ™ U-35 | 0.9 | 202 | 67 | 54 |

The data in Tables 2 through 5 indicates that a composition having a hydroxyl-containing aromatic compound can exhibit significantly higher flow retention after aging.

Examples 35–42

Epoxy compositions including other thermoplastic polymers were prepared according to the procedure of Example 1 using 50 pbw of Epoxy 1, 50 pbw of Epoxy 2, 200 pbw of a thermoplastic polymer, 10 pbw of 2MZ-Azine curative, and 0.83 pbw of HFC 1. The thermoplastic polymers, shown in Table 6, were DYNAPOL™ S1402 polyester, ELVAX™ 40W EVA copolymer, ELVALOY™ 741 EVA copolymer, or blends of the polyester and an EVA copolymer. Examples 40–42 also included 10 pbw of Foral 85, a hydrocarbon tackifier obtained from Hercules Chemical Co. The sheets were then tested for flow retention after aging for 7 days at 38° C. Test results are shown in Table 6 below.

TABLE 6

| | Thermoplastic Polymer | | Thickness (mm) | Initial Flow (mm) | % FR After 7 Days @ 38° C. |
|---|---|---|---|---|---|
| Ex. | Type | Parts | | | |
| 35 | DYNAPOL ™ S1402 | 60 | 1.6 | 89 | 80 |
| 36 | ELVAX ™ 40W | 60 | 1.6 | 5 | 40 |
| 37 | ELVALOY ™ 741 | 60 | 1.7 | 4 | 75 |
| 38 | DYNAPOL ™ S1402 ELVAX ™ 40W | 40 20 | 1.6 | 50 | 74 |
| 39 | DYNAPOL ™ S1402 ELVALOY ™ 741 | 40 20 | 1.6 | 42 | 67 |
| 40 | DYNAPOL ™ S1402 | 60 | 1.6 | 114 | 90 |
| 41 | ELVAX ™ 40W | 60 | 1.7 | 8 | 75 |
| 42 | ELVALOY ™ 741 | 60 | 1.6 | 4 | 100 |

The data in Table 6 indicates that thermoplastic polymers may be useful additives in the epoxy-containing compositions of the present invention without negatively affecting the flow retention properties of the composition.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalent thereto.

What is claimed is:

1. An extended shelf life composition comprising:
   (a) at least one epoxy composition suitable for use as at least one of an adhesive and a sealant, wherein said epoxy composition comprises at least one curative that is a solid at about 25° C. said curative comprising a primary aliphatic amine, a secondary aliphatic amine, a primary aromatic amine, a secondary aromatic amine, or a combination thereof; and
   (b) at least one hydroxyl-containing aromatic compound added to said epoxy composition in a sufficiently low amount that the shelf life of said epoxy composition is extended beyond what it would be without the addition of said at least one hydroxyl-containing aromatic compound, wherein said at least one hydroxyl-containing aromatic compound has a molecular structure

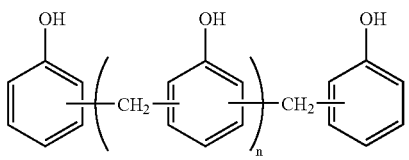

wherein n is in the range of from 1 to 8.

2. The extended shelf life composition of claim 1, wherein the amount of said at least one hydroxyl-containing aromatic compound is in the range of greater than 0 to about 8 parts per weight based on 100 parts per weight of epoxy resin present.

3. The extended shelf life composition of claim 1, wherein said extended shelf life composition has a 45° flow retention value of at least 40% of an initial flow retention value after being age conditioned for 14 days at room temperature.

4. The extended shelf life composition of claim 1, wherein said extended shelf life composition has a 45° flow retention value of at least 50% of an initial flow retention value after being age conditioned for 14 days at room temperature.

5. The extended shelf life composition of claim 1, wherein said extended shelf life composition has a 45° flow retention value of at least 75% of an initial flow retention value after being age conditioned for 14 days at room temperature.

6. The extended shelf life composition of claim 1, wherein said extended shelf life composition has a 45° flow retention value of at least 90% of an initial flow retention value after being age conditioned for 14 days at room temperature.

7. The extended shelf life composition of claim 1, wherein said extended shelf life composition further comprises at least one thennoplastic polymer.

8. The extended shelf life composition of claim 1, wherein in the range of from 2 to 6.

9. The extended shelf life composition of claim 1, wherein at least one hydroxyl-containing aromatic compound has a number average molecular weight in the range of from about 450 to about 750, and a hydroxyl functionality in the range of from about 4 to about 7.

10. The extended shelf life composition of claim 1, wherein said at least one curative comprises a heat-activated amine curing agent.

11. The extended shelf life composition of claim 1, wherein said at least one curative has a melting point above 100° C.

12. The extended shelf life composition of claim 1, wherein said at least one curative has a melting point above 145° C.

13. The extended shelf life composition of claim 1, wherein said at least one curative comprises an imidazole, a substituted imidazole, a guanidine, a substituted guanidine, a urea, a substituted urea; and mixtures thereof, wherein said substituted imidazole, substituted guanidine, or substituted urea contains one or more substituents selected from alkyl groups having up to 20 carbon atoms, bcnzyl groups, phenyl groups, amine groups, melarnine groups, and cyano groups.

14. The extended shelf life composition of claim 1, wherein said at least one curative comprises 2methyl-imidazole, 2-phenyl-imidazole, isophorone bisdimethyl urea, or dicyaudiamide.

15. The extended shelf life composition of claim 1, wherein said at least one curative comprises an imidazole, a substituted imidazole, or a combination thereof, wherein said substituted imidazole contains one or more substiuents selected from alkyl groups having up to 20 carbon atoms, beuzyl groups, phenyl groups, amine groups, inelarnine groups, and cyano groups.

16. The extended shelf life composition of Claim 1, wherein said at least one curative comprises 2,4-diamino-6-(2'methylimidazoleyl-(1'))ethyl-s-triazine.

17. A paste comprising said extended shelf life composition of Claim 1.

18. A hot-melt adhesive comprising said extended shelf life composition of claim 1.

19. The extended shelf life composition of claim 1, wherein said epoxy composition is a one-part epoxy composition.

20. A method of improving the shelf life of an epoxy composition, said method comprising:
   providing an epoxy composition suitable for use as at least one of an adhesive and a sealant, wherein said epoxy composition comprises at least one curative that is a solid at about 25° C., said curative comprising a primary aliphatic amine, a secondary aliphatic amine, a primary aromatic amine, a secondary aromatic amine, or a combination thereof;
   including at least one hydroxyl-containing aromatic compound in the epoxy composition, wherein said at least one hydroxyl-containing aromatic compound has a molecular structure

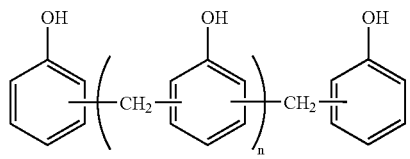

wherein n is in the range of from 1 to 8
   providing the at least one hydroxyl-containing aromatic compound in a sufficiently low amount to extend the shelf life of the epoxy composition beyond what the shelf life would be without the addition of the at least one hydroxyl-containing aromatic compound.

21. The method of claim 20, wherein said including comprises:
   including in the range of greater than 0 to about 8 parts per weight of said at least one bydroxyl-containing aromatic compound based on 100 parts per weight of epoxy resin present.

22. The method of claim 20, wherein the epoxy composition is a one-part epoxy composition.

* * * * *